US011226757B2

(12) United States Patent
Jiang

(10) Patent No.: US 11,226,757 B2
(45) Date of Patent: Jan. 18, 2022

(54) HOT PLUG MEMORY DEVICE DATA PROTECTION METHOD

(71) Applicant: Realtek Semiconductor Corporation, Hsinchu (TW)

(72) Inventor: Guo-Bing Jiang, JiangSu (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 56 days.

(21) Appl. No.: 16/674,145

(22) Filed: Nov. 5, 2019

(65) Prior Publication Data

US 2020/0142626 A1 May 7, 2020

(30) Foreign Application Priority Data

Nov. 5, 2018 (CN) .......................... 201811308846.6

(51) Int. Cl.
*G06F 3/06* (2006.01)
*G06F 12/0802* (2016.01)
*G06F 11/14* (2006.01)
*G06F 11/30* (2006.01)

(52) U.S. Cl.
CPC .......... *G06F 3/0647* (2013.01); *G06F 3/0604* (2013.01); *G06F 3/0659* (2013.01); *G06F 3/0679* (2013.01); *G06F 11/1402* (2013.01); *G06F 12/0802* (2013.01); *G06F 11/3055* (2013.01); *G06F 2212/60* (2013.01)

(58) Field of Classification Search
CPC .... G06F 3/0604; G06F 3/0647; G06F 3/0659; G06F 3/0679; G06F 11/3055; G06F 11/1402; G06F 2212/60; G06F 2212/2164; G06F 12/0802; G06F 13/4081
See application file for complete search history.

(56) References Cited

U.S. PATENT DOCUMENTS 6,047,343 A * 4/2000 Olarig ................. G06F 13/4081
710/302
9,529,543 B1 * 12/2016 Chinnakkonda
Vidyapoornachary ......................
G06F 3/061
9,721,660 B2 * 8/2017 Kelly .................. G06F 13/4282
(Continued)

OTHER PUBLICATIONS

Wikipedia, Serial presence detect, Sep. 11, 2017, The Internet Archive, The Wikipedia page titled "Serial presence detect" as preserved by the Internet Archive on Sep. 11, 2017, pp. 1-14 https://web.archive.org/web/20170911101354if_/https://en.wikipedia.org/wiki/Seria_presence_detect (Year: 2017).*

(Continued)

*Primary Examiner* — Reginald G Bragdon
*Assistant Examiner* — Curtis James Kortman
(74) *Attorney, Agent, or Firm* — Locke Lord LLP; Tim Tingkang Xia, Esq.

(57) ABSTRACT

A method for hot plug memory device data protection is provided. Removal of a hot plug memory device from a connection interface is determined by a status of an interface plug-in detection signal, wherein the hot plug memory device is electrically coupled to a host through the connection interface. A command for moving data is transmitted to the hot plug memory device by the host. Temporary data is moved from a cache module of the hot plug memory device to a flash memory module of the hot plug memory device by the hot plug memory device in response to the command for moving data.

7 Claims, 4 Drawing Sheets

(56) References Cited

U.S. PATENT DOCUMENTS

2002/0002651 A1* 1/2002 MacLaren ............ G06F 13/4081
                                                          711/102
2017/0357604 A1* 12/2017 Lim .................... G06F 12/0879

OTHER PUBLICATIONS

Jedec, Annex L: Serial Presence Detect (SPD) for DDR4 SDRAM Modules, Sep. 2015, JEDEC, Release 3: SPD4.1.2.L-3, pp. 1-81 (Year: 2015).*

Chew Lye Huat, "Compact Hot Swap Solution Simplifies Advanced Mezzanine Card Design", Mar. 2008, Linear Technology, vol. XVIII No. 1, pp. 27-30 (Year: 2008).*

* cited by examiner

HOT PLUG MEMORY DEVICE DATA PROTECTION METHOD

RELATED APPLICATIONS

This application claims priority to China Application Serial Number 201811308846.6, filed Nov. 5, 2018, which is herein incorporated by reference.

BACKGROUND

Field of Invention

The present invention relates to a memory operation technology. More particularly, the present invention relates to a hot plug memory device data protection method.

Description of Related Art

In order to accomplish higher data access efficiency, cache modules are disposed besides memory units in lots of memory devices. Since the data access speed of the cache modules is higher than the data access speed of the memory units, the cache modules are used to store data that is processed in real time to increase the efficiency of the data access. However, the data is lost when cache modules are in a power-off status. When the memory device is a hot plug memory device, the cache module therein loses data once the memory device is accidentally plugged out.

Accordingly, what is needed is a hot plug memory device data protection method to address the issues mentioned above.

SUMMARY

An aspect of the present invention is to provide a method that includes the steps outlined below. A removal of a hot plug memory device from a connection interface is determined by a host according to a status of an interface plug-in detection signal, the hot plug memory device being electrically coupled to the host through the connection interface. A command for moving data is transmitted to the hot plug memory device by the host such that the hot plug memory device. Temporary data is moved from a cache module of the hot plug memory device to a flash memory module of the hot plug memory device in response to the command for moving data.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
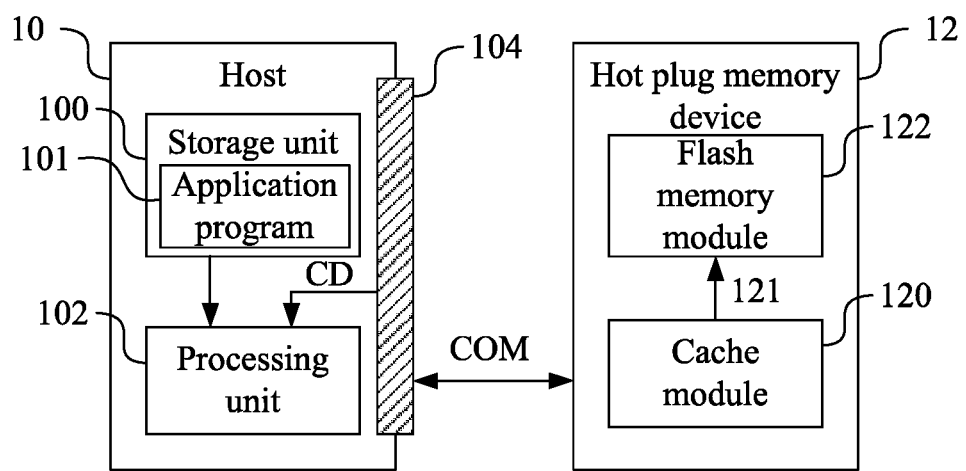
FIG. 1 is a block diagram of a computer system in an embodiment of the present invention.

Reference is made to FIG. 1. FIG. 1 is a block diagram of a computer system 1 in an embodiment of the present invention. The computer system 1 includes a host 10 and a hot plug memory device 12.

In an embodiment, the host 10 can be such as, but not limited to a desktop, a notebook computer or a handheld electronic device such as a smartphone or a tablet personal computer. The host 10 may includes a storage unit 100, a processing unit 102 and a connection interface 104.

The storage unit 100 is configured to store an application program 101 or other data. The processing unit 102 is electrically coupled to the storage unit 100 and is able to access the application program 101 to perform related operations. The connection interface 104 is configured to allow other external devices to be electrically coupled thereto such that the processing unit 102 performs communication with the external devices through the connection interface 104.

The hot plug memory device 12 can be such as, but not limited to a secure digital (SD) memory card, a compact flash (CF) memory card or a universal flash storage (UFS) memory card. In an embodiment, the hot plug memory device 12 can be electrically coupled to the host 10 through the connection interface 104 such that the host 10 can perform communication with the hot plug memory device 12 through such as, but not limited to data, command, clock signal, power signal or a combination thereof.

The hot plug memory device 12 includes a cache module 120 and a flash memory module 122. The flash memory module 122 can preserve data whether the hot plug memory device 12 is at a power-on status or a power-off status. The storage of the cache module 120 is temporary. In actual application, when the host 10 accesses the hot plug memory device 12, the data that is in use is stored temporarily in the cache module 120 to provide rapid data access. As a result, when the hot plug memory device 12 is at a power-off status, the stored data is lost.

In an embodiment, the hot plug memory device 12 may be plugged out from the connection interface 104 when hot plug memory device 12 is still in operation such that the data stored in the cache module 120 can not be saved. Such a condition results in the loss of the data.

Figure 2:
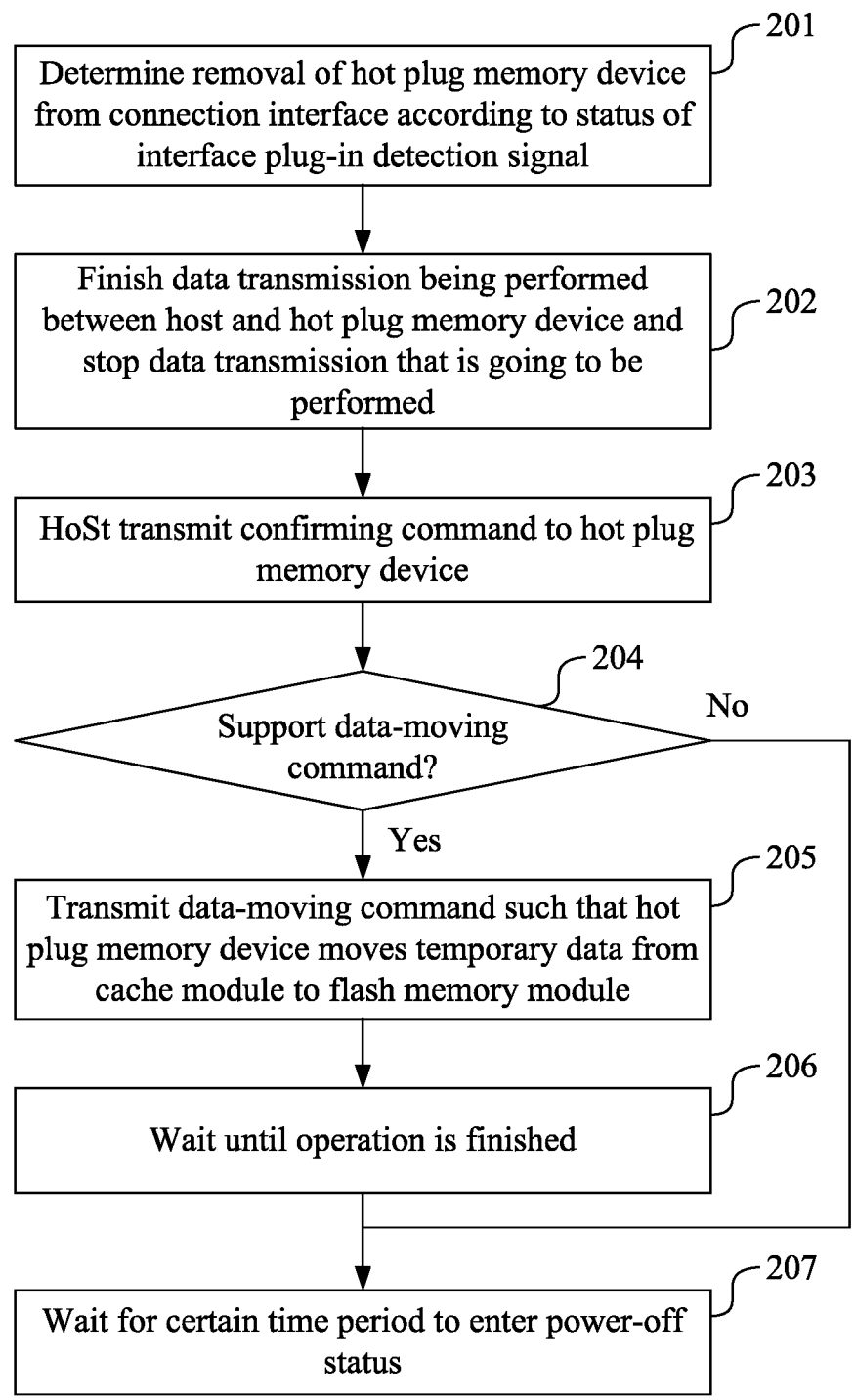
FIG. 2 is a flow chart of a hot plug memory device data protection method in an embodiment of the present invention.
Figure 3A:
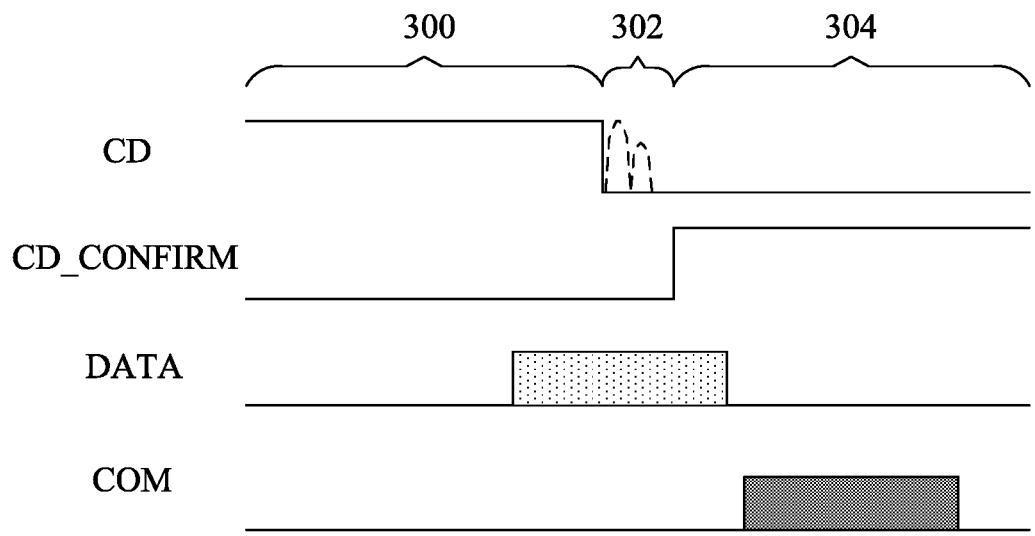
FIG. 3A and FIG. 3B are timing diagrams of the signals transmitted between the host and the hot plug memory device in the computer system under different data transmission conditions in an embodiment of the present invention.
Figure 3B:
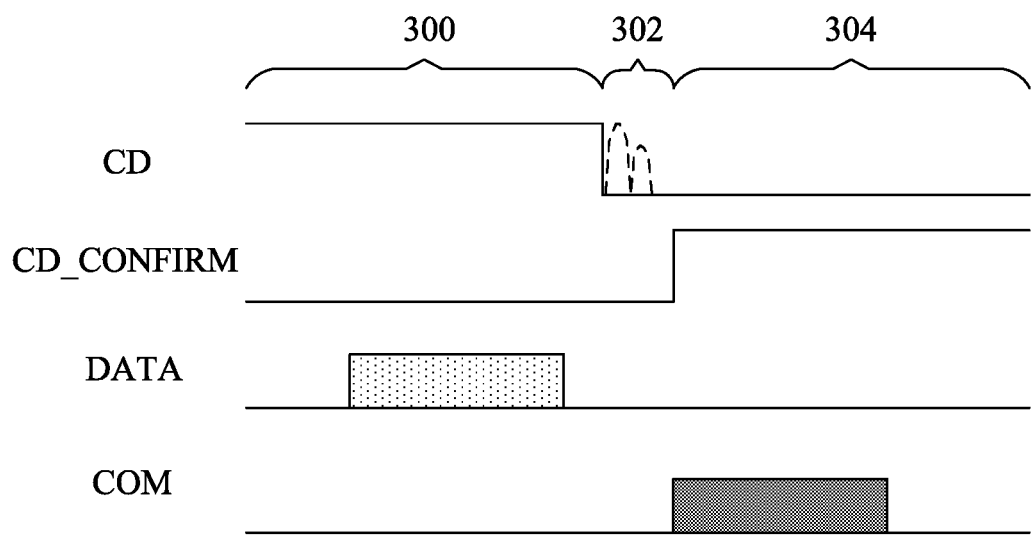

Reference is now made to FIG. 2, FIG. 3A and FIG. 3B at the same time. FIG. 2 is a flow chart of a hot plug memory device data protection method 200 in an embodiment of the present invention. FIG. 3A and FIG. 3B are timing diagrams of the signals transmitted between the host 10 and the hot plug memory device 12 in the computer system 1 under different data transmission conditions in an embodiment of the present invention.

The hot plug memory device data protection method 200 can be used in the computer system 1 illustrated in FIG. 1. More specifically, in an embodiment, the processing unit 102 can access the application program 101 to execute the hot plug memory device data protection method 200 to prevent the data loss caused when the hot plug memory device 12 is accidentally plugged out from the connection interface 104.

The description of the hot plug memory device data protection method 200 is made in accompany with the components illustrated in FIG. 1. The hot plug memory device data protection method 200 includes the operations outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 201, a removal of the hot plug memory device 12 from the connection interface 104 is determined by the processing unit 102 of the host 104 according to a status of an interface plug-in detection signal CD.

In an embodiment, when the hot plug memory device 12 is electrically coupled to the host 14 through the connection interface 104, the interface plug-in detection signal CD is at a plug-in status 300 (such as, but not limited to the high voltage level illustrated in FIG. 3A and FIG. 3B).

When the plugging status of the hot plug memory device 12 changes, since the plug-in and plug-out of the hot plug memory device 12 with respect to the connection interface 104 is mechanical, a signal glitch status 302 of the interface plug-in detection signal CD is presented.

In an embodiment, the processing unit 102 of the host 10 can perform a glitch elimination process after the interface plug-in detection signal CD turns to the signal glitch status 302. After the glitch elimination process, the processing unit 102 of the host 10 determines whether a plug-out status 304 of the interface plug-in detection signal CD is entered (such as, but not limited to the low voltage level illustrated in FIG. 3A and FIG. 3B).

When the plug-out status 304 is entered after the glitch elimination process is performed subsequent to the signal glitch status 302, the processing unit 102 of the host 10 determines the removal of the hot plug memory device 12 from the connection interface 104. When the plug-in status 300 is remained after the glitch elimination process is performed subsequent to the signal glitch status 302, the processing unit 102 of the host 10 determines that the hot plug memory device 12 is not removed from the connection interface 104.

In an embodiment, the interface plug-in detection signal CD can be processed by a signal processing component (not illustrated) to generate a plugging confirmation signal CD_CONFIRM. The plugging confirmation signal CD_CONFIRM is at a first voltage level during the plug-in status 300 and the signal glitch status 302 (such as, but not limited to the low voltage level illustrated in FIG. 3A and FIG. 3B), and is at a second voltage level during the plug-out status 304 (such as, but not limited to the high voltage level illustrated in FIG. 3A and FIG. 3B).

The processing unit 102 can substantially perform determination according to the plugging confirmation signal CD_CONFIRM such that the removal of the hot plug memory device 12 from the connection interface 104 is substantially determined when the plugging confirmation signal CD_CONFIRM is at the second voltage level.

In another embodiment, the processing unit 102 of the host 10 determines whether the signal glitch status 302 is entered such that the removal of the hot plug memory device 12 from the connection interface 104 is determined once the interface plug-in detection signal CD enters the signal glitch status 302.

In step 202, the data transmission being performed between the host 10 and the hot plug memory device 12 is finished and the data transmission that is going to be performed between the host 10 and the hot plug memory device 12 is stopped.

As illustrated in FIG. 3A, when the data transmission DATA between the host 10 and the hot plug memory device 12 is presented during the time period that the interface plug-in detection signal CD turns from the plug-in status 300 to the signal glitch status 302 and further to the plug-out status 304, the host 12 gives priority to finish the data transmission DATA to perform subsequent operations.

As illustrated in FIG. 3B, when the data transmission DATA between the host 10 and the hot plug memory device 12 is presented when the interface plug-in detection signal CD enters the plug-out status 304, the host 10 stops the data transmission DATA to perform subsequent operations.

It is appreciated that the data transmission DATA described above can be the read operation or the write operation performed by the host 10 to the hot plug memory device 12.

In step 203, the host 10 transmits a confirming command (not illustrated) to the hot plug memory device 12.

In step 204, the host 10 determines whether the hot plug memory device 12 supports a data-moving command COM according to the response of the hot plug memory device 12 made in accordance with the confirming command. In an embodiment, the data-moving command COM is a power off notification command.

In step 205, when the hot plug memory device 12 supports the data-moving command COM, the host 10 transmits the data-moving command COM to the hot plug memory device 12 such that the hot plug memory device 12 moves temporary data 121 from the cache module 120 to the flash memory module 122.

Subsequently, in step 206, the hot plug memory device 12 can wait until the operation is finished and wait for a certain time period to enter the power-off status in step 207 to terminate the flow.

When the host 10 determines that the hot plug memory device 12 does not support the data-moving command COM in step 204, the flow directly goes to step 207 to terminate the flow.

It is appreciated that in the flow described above, part of the steps, e.g. step 203 and step 204, can be selectively performed depending on the practical conditions. In an embodiment, steps 203 and 204 can be neglected. In another embodiment, steps 203 and 204 can be performed when the hot plug memory device 12 and the host 10 begin to be electrically coupled.

Figure 4:
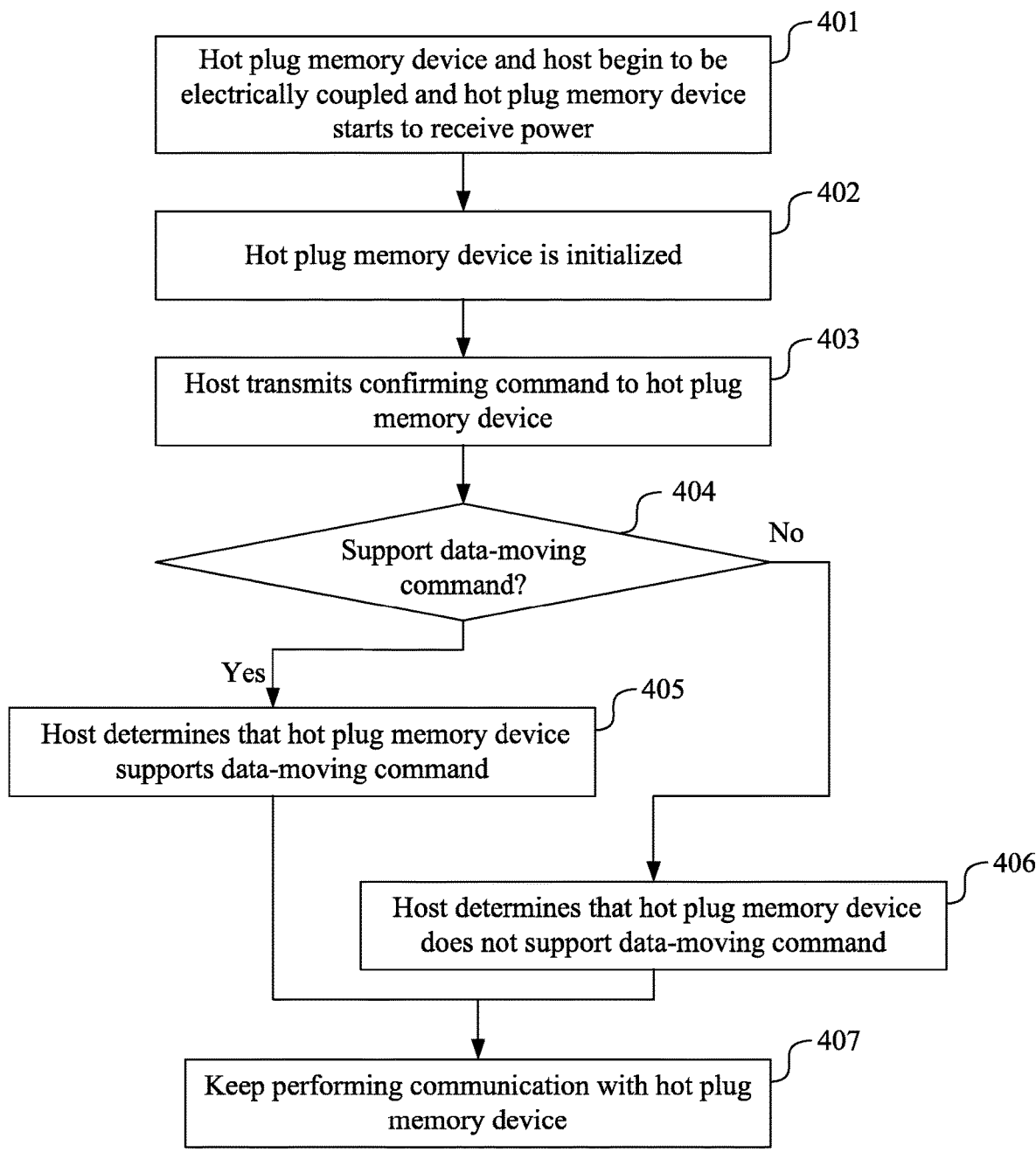
FIG. 4 is a flow chart of a confirming method to confirm whether the command is supported in an embodiment of the present invention.

Reference is now made to FIG. 4. FIG. 4 is a flow chart of a confirming method 400 to confirm whether the command is supported in an embodiment of the present invention.

In step 401, the hot plug memory device 12 and the host 10 begin to be electrically coupled and the hot plug memory device 12 starts to receive power.

In step 402, the hot plug memory device 12 is initialized.

In step 403, the host 10 transmits the confirming command (not illustrated) to the hot plug memory device 12.

In step 404, the host 10 determines whether the hot plug memory device 12 supports the data-moving command COM according to the response of the hot plug memory device 12 made in accordance with the confirming command.

When the response shows that the data-moving command COM is supported, in step 405, the host 10 determines that the hot plug memory device 12 supports the data-moving command COM. When the response shows that the data-moving command COM is not supported, in step 406, the host 10 determines that the hot plug memory device 12 does not support the data-moving command COM.

After step 405 and step 406, the host 10 keeps performing communication with the hot plug memory device 12 in step 407 to terminate the flow.

As a result, in the present embodiment, by using the flow of the method 400 to perform confirmation, the hot plug memory device data protection method 200 can skip step 203 and step 203 after step 202 to directly perform step 205. Such an embodiment does not require an additional time to perform confirmation such that the data moving of the hot plug memory device 12 can be performed even faster.

As a result, the hot plug memory device data protection method 200 of the present invention can detect the removal of the hot plug memory device 12 by using the detection of the status of the interface plug-in detection signal. Since the time period between the detection of the removal of the hot plug memory device 12 to the complete removal of the hot plug memory device 12 includes dozens of milliseconds, the host 10 can further transmit the data-moving command COM such that the hot plug memory device 12 moves the temporary data from the cache module 120 to the flash memory module 122 to prevent the data loss and accomplish the object of data protection.

In the embodiment described above, the power off notification command is used as an example of the data-moving command COM. In another embodiment, the data-moving command COM can be a flush cache command or a synchronize cache command. Similar to the embodiment of the power off notification command, the host 10 can perform a confirmation to confirm whether the cache module 120 of the hot plug memory device 12 can be enabled before the flush cache command is transmitted and further transmit the flush cache command after the confirmation. Further, the host 10 can also perform the confirmation when the hot plug memory device 12 and the host 10 begin to be electrically coupled to accelerate the process of data moving of the hot plug memory device 12. The other steps of the flow in the embodiment that uses the flush cache command as the data-moving command COM are the same as the steps of the flow in the embodiment that uses the power off notification command as the data-moving command COM. No detail is further described herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method applied to a computer system including a host and a hot plug memory device which is removably plugged in a connection interface of the host, comprising:
   generating, by the connection interface, an interface plug-in detection signal, wherein the interface plug-in detection signal is at a first voltage level when the hot plug memory device is coupled to the connection interface and a removal of the hot plug memory device from the connection interface is not performed yet, the interface plug-in detection signal is at a second voltage level when the removal of the hot plug memory device from the connection interface is currently performed, and the interface plug-in detection signal jitters between the first voltage level and the second voltage level when the removal of the hot plug memory device from the connection interface is started;
   converting, by the host, the interface plug-in detection signal into a plugging confirmation signal, wherein the plugging confirmation signal is at a third voltage level when the interface plug-in detection signal is at the first voltage level or jitters between the first voltage level and the second voltage level, and the plugging confirmation signal is at a fourth voltage level when the interface plug-in detection signal is at the second voltage level;
   determining, by the host, that the removal of the hot plug memory device from the connection interface is currently performed when the plugging confirmation signal is at the fourth voltage level;
   transmitting, by the host, a data-moving command to the hot plug memory device when the interface plug-in detection signal is at the second voltage level; and
   moving, by the hot plug memory device, temporary data from a cache module of the hot plug memory device to a flash memory module of the hot plug memory device in response to the data-moving command.

2. The method of claim 1, wherein the data-moving command is a power off notification command.

3. The method of claim 2, further comprising:
   transmitting a command for confirmation to determine whether the hot plug memory device supports the data-moving command; and
   determining that the hot plug memory device supports the data-moving command according to a response of the hot plug memory device such that the host transmits the data-moving command to the hot plug memory device.

4. The method of claim 3, wherein the command for confirmation is transmitted when the hot plug memory device and the host begin to be electrically coupled.

5. The method of claim 1, wherein the data-moving command is a command for flushing cache or a command for synchronizing cache.

6. The method of claim 1, further comprising:
   determining whether the cache module is enabled; and
   confirming that the cache module is enabled such that the host transmits the data-moving command to the hot plug memory device.

7. The method of claim 1, after the step of determining that the removal of the hot plug memory device from the connection interface is currently performed, the method further comprises:
   finishing a first data transmission being performed between the host and the hot plug memory device; and
   stopping a second data transmission that is going to be performed between the host and the hot plug memory device.

* * * * *